United States Patent Office 2,761,001
Patented Aug. 28, 1956

2,761,001

LATEX FOAM SPONGE CONTAINING AN ALKALI SALT OF PERFLUOROMONOCARBOXYLIC ACID

Charles F. Eckert, Westwood, N. J., assignor to United States Rubber Company, New York, N. Y., a corporation of New Jersey No Drawing. Application March 2, 1953,
Serial No. 339,897

6 Claims. (Cl. 260—723)

This invention relates to the manufacture of latex foam sponge.

Sponge rubber is conventionally made by forming latex containing a frothing agent into a froth or foam, coagulating the latex in the foam with a gelling agent, such as alkali-metal silicofluoride, and drying and vulcanizing the gelled foam to form sponge rubber. One difficulty in such manufacture is that the foaming agents, such as fatty acid soaps and sulfonated and sulfated compounds containing organic radicals containing at least eight carbon atoms, are also stabilizers for the latex and the large amount of such foaming agents used causes excessive stabilization of the latex in the foam against coagulation by the gelling agent and often necessitates the addition of presensitizing agents, such as a polyalkylene polyamine, to effect gellation before mechanical breakdown of the foam. In some latices and under certain operating conditions the latex will not sufficiently respond to this pre-sensitization procedure and so permit good quality foam products to be made therefrom. Furthermore, polyalkylene polyamines are costly and undesirable because of the objection to their extensive use frequently encountered among those engaged in the making of foam from latex. A further difficulty is encountered where the foaming agents, such as a fatty acid soap, precipitates as the pH is lowered. In such cases, the foam may break down or collapse before complete gelation by reduction of the pH as by hydrolysis of a silicofluoride gelling agent.

I have found that the above difficulties are overcome by including as a latex frothing agent an alkali salt of a per-fluoromonocarboxylic acid of the aliphatic series having 8 to 18 carbon atoms in the molecule. Such compounds greatly enhance the frothing ability without substantially increasing the stability of the latex against coagulation on reduction in pH, and the froths are mechanically stable at low as well as high pH's. Thus they may be used to reduce the foam density with conventional amounts of frothing agents, such as fatty acid soaps, or to reduce the amount of conventional frothing agent that need be used to give a foam of the same density, while maintaining the mechanical stability of the foam at low pH's, and preventing breakdown of the foam with increased sponge density or total collapse of the foam before gelling.

In carrying out the present invention, there is incorporated in the latex before frothing a small amount of an alkali (alkali-metal or ammonium) salt of a perfluoromonocarboxylic acid of the aliphatic series having 8 to 18 carbon atoms in the molecule. The latex may also contain conventional compounding ingredients, such as fillers, vulcanizing ingredients and the like. The latex is conventionally formed into a foam, as by mechanically whipping air into the latex or by introduction of a gas into the latex as by decomposition of a peroxide in the latex. A conventional gelling agent, such as sodium silicofluoride, may be mixed into the foam, the thus sensitized foam poured into a mold, gelled and heated to produce the vulcanized sponge rubber.

The amount of alkali salt of the perfluorocarboxylic acid added to the latex generally will be from 0.2 to 1 part per 100 parts of latex solids. There is preferably present, primarily as a stabilizer for the latex during foaming, at least 0.5 part, per 100 parts of latex solids, of water-soluble soap of hydrocarbon soap-forming monocarboxylic acid. The soap-forming acids of such water-soluble (alkali) soaps may be abietic (rosin) acids, or aliphatic (fatty) acids having 8 to 24 carbon atoms in the molecule, or mixtures thereof as in tall oil. The amount of such water-soluble soap generally added to natural rubber latex will not be over 1 part per 100 parts of latex solids although higher amounts up to 5 parts may be used if desired. In synthetic rubber latices, there may be present such alkali soaps of rosin and/or fatty acids in amount up to 5 parts per 100 parts of latex solids, usually as residual emulsifying agents from the polymerization of the synthetic rubber-forming monomers. When sodium silicofluoride is used as the gelling agent, generally 0.5 to 5 parts are mixed into the foam per 100 parts of latex solids.

The latex used in making the foam may be natural rubber latex, or synthetic rubber latex, or a mixture thereof. Such synthetic rubber latex may be an aqueous emulsion polymerizate of various butadiene-1,3 hydrocarbons, for example, butadiene-1,3, isoprene, piperylene, 2,3-dimethylbutadiene-1,3, or of mixtures thereof, or of mixtures of one or more such butadiene-1,3 hydrocarbons with one or more other polymerizable compounds which are capable of forming rubbery compounds with butadiene-1,3 hydrocarbons, for example, up to 70% of such mixture of compounds which contain a $CH_2=C<$ group where at least one of the disconnected valences is attached to an electroactive group, that is, a group which substantially increases the electrical dissymmetry or polar character of the molecule. Examples of compounds which contain a $CH_2=C<$ group and are copolymerizable with butadiene-1,3 hydrocarbons are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; iso-butylene; methyl vinyl ether; methyl vinyl ketone; vinylidene chloride.

The following examples illustrate the invention. All parts and percentages referred to herein are by weight:

*Example I*

A natural rubber creamed latex of 67% solids concentration and containing about 0.7% ammonia was deammoniated by addition of formaldehyde and divided into two parts, and compounded for frothing according to the following recipes A and B, only recipe B having added thereto a 10% aqueous solution of ammonium perfluorocaprylate. The other compounding ingredients were added as conventional aqueous solutions or pastes.

| Ingredients | Recipes (Dry Weight) | |
|---|---|---|
| | A | B |
| Natural Rubber Latex | 100 | 100 |
| Ammonium Fluorocaprylate | 0 | 1 |
| Zinc Dimethyl Dithiocarbamate | 0.65 | 0.65 |
| Zinc Salt of Mercaptobenzothiazole | 1.25 | 1.25 |
| Zinc Oxide | 5 | 5 |
| Sulfur | 1.5 | 1.5 |
| Potassium Hydroxide | 0.2 | 0.2 |
| Potassium Oleate | 1 | 1 |

The latex compounds were shipped to a froth or foam; 2 parts of sodium silicofluoride as a 37% aqueous paste were added to each of the latex foams, and the foams were poured into molds at 26° F., allowed to gel, and vulcanized one hour at 100° C. The drop in pH values during gelation was measured by means of a pH meter. The foams were completely gelled or coagulated at a pH of about 8.5.

The froth density in grams per cubic centimeter was taken at the time each batch was poured, and the gelling time was noted as the interval between the addition of the sodium silicofluoride and the formation of a solid coagulum. The froth density of the foam prepared without the ammonium perfluorocaprylate was 0.123 gm./cc. and the gelling time was 500 seconds. The froth density of the foam prepared with the ammonium perfluorocaprylate was 0.089 gm./cc. and the gelling time was 580 seconds, showing superior frothing properties of the latter.

The sponge made from the latex containing the ammonium perfluorocaprylate was of excellent quality and showed no collapse, whereas the sponge made without this chemical was partially collapsed.

Further evidence of the desirability of ammonium perfluorocaprylate as a frothing agent was obtained by squeezing the wet, cured rubber sponges. The one made from the latex containing ammonium perfluorocaprylate exuded a fine aqueous froth which was not obtainable in the absence of ammonium perfluorocaprylate. This shows the persistence of the ammonium perfluorocaprylate froth despite the decrease in pH which is an inherent phenomenon in the silicofluoride gelation process. This persistence tends to prevent collapse of the frothed latex just prior to coagulation.

In a similar run using zero (control) and 0.25 part of ammonium perfluorocaprylate, the froth made from the latex containing the ammonium perfluorocaprylate had a pour density of 0.122 gm./cc. and the sponge was of excellent quality, whereas the control froth made from the latex without the ammonium perfluorocaprylate had a pour density of 0.134 and the sponge collapsed.

Various amounts of alkali salts of perfluoromonocarboxylic acids having less than eight carbon atoms in the molecule, viz., sodium perfluoropropionate, sodium perfluorobutyrate, sodium perfluorocaproate and ammonium perfluorocaproate added to recipe A and the latex foamed, shaped, gelled and vulcanized as above failed to improve the frothing ability of the latex or the durability of the froth produced. Alkali salts of perfluoromonocarboxylic acids having more than eight carbon atoms in the molecule, viz. alkali-metal and ammonium salts of perfluorolauric, perfluorocapric, perfluorooleic, perfluoromyristic, perfluoropalmitic and perfluorostearic acids will be effective to improve the frothing characteristics of the latex.

*Example II*

A GR-S latex was prepared by polymerizing an aqueous emulsion containing 70 parts of butadiene-1,3 and 30 parts of styrene monomers, 3 parts of potassium soap of refined and heated tall oil acids in which the ratio of rosin acid to fatty acid was about 2:1 as emulsifier, 1.5 parts of the condensation product of formaldehyde and sodium naphthalene sulfonate as additional stabilizer, and conventional amounts of activator and catalyst at 50° F. to about 60% conversion of monomers to polymer, or to 50% solids concentration after stripping unreacted monomers. The stripped latex was heat concentrated to 62% solids content.

Portions of the GR-S latex prepared as above were compounded for frothing according to the following recipes C, D and E, recipes D and E having added thereto a 10% aqueous solution of ammonium perfluorocaprylate in amount to give 0.5 and 1 part of the salt per 100 parts of polymerizable monomers, respectively. The other compounding ingredients were added as conventional aqueous solutions or pastes.

| Ingredients | Recipes (Dry Weight) | | |
|---|---|---|---|
| | C | D | E |
| GR-S Latex | 100 | 100 | 100 |
| Ammonium Perfluorocaprylate | 0 | 0.5 | 1 |
| Zinc Diethyl Dithiocarbamate | 0.65 | 0.65 | 0.65 |
| Zinc Salt of Mercaptobenzothiazole | 1.25 | 1.25 | 1.25 |
| Zinc Oxide | 5 | 5 | 5 |
| Sulfur | 1.5 | 1.5 | 1.5 |

The latex compounds were whipped to a froth; 2 parts of sodium silicofluoride as a 37% aqueous paste were added to each of the latex froths and the foams were poured into molds at 26° C., allowed to gel, and vulcanized one hour at 100° C. The froth density of the foam prepared without the ammonium perfluorocaprylate was 0.185 gm./cc., and the gelling time was 160 seconds. The froth density of the foam prepared with the 0.5 part of ammonium perfluorocaprylate was 0.130 gm./cc. and the gelling time was 140 seconds. The froth density of the foam prepared with the 1 part of ammonium perfluorocaprylate was 0.104 gm./cc., and the gelling time was 210 seconds. The decrease in froth density on addition of the ammonium perfluorocaprylate to the latex formulation shows the superior frothing properties of the latex containing the ammonium perfluorocaprylate.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making sponge rubber which comprises preparing a fluid foam of a rubber latex containing 0.2 to 1 part, per 100 parts of latex solids, of an alkali salt of a perfluoromonocarboxylic acid of the aliphatic series having 8 to 18 carbon atoms in the molecule, and 0.5 to 5 parts, per 100 parts of latex solids, of a water-soluble soap of soap-forming monocarboxylic acid, shaping and gelling the foam, and vulcanizing to form sponge rubber.

2. The method of making sponge rubber which comprises preparing a fluid foam of a rubber latex containing 0.2 to 1 part of an alkali salt of a perfluoromonocarboxylic acid of the aliphatic series having 8 to 18 carbon atoms in the molecule, 0.5 to 5 parts of a water-soluble soap of soap-forming monocarboxylic acid, and 0.5 to 5 parts of sodium silicofluoride, per 100 parts of latex solids, shaping and gelling the foam, and vulcanizing to form sponge rubber.

3. The method of making sponge rubber which comprises preparing a fluid foam of a rubber latex containing 0.2 to 1 part, per 100 parts of latex solids, of alkali perfluorocaprylate, and 0.5 to 5 parts, per 100 parts of latex solids, of a water-soluble soap of soap-forming monocarboxylic acid, shaping and gelling the foam, and vulcanizing to form sponge rubber.

4. The method of making sponge rubber which comprises preparing a fluid foam of a rubber latex containing 0.2 to 1 part of alkali perfluorocaprylate, 0.5 part of a water-soluble soap of soap-forming monocarboxylic acid, and 0.5 to 5 parts of sodium silicofluoride, per 100 parts of latex solids, shaping and gelling the foam, and vulcanizing to form sponge rubber.

5. The method of making sponge rubber which comprises preparing a fluid foam of a rubber latex containing 0.2 to 1 part, per 100 parts of latex solids, of ammonium perfluorocaprylate, and 0.5 to 5 parts, per 100 parts of latex solids, of a water-soluble soap of soap-forming monocarboxylic acid, shaping and gelling the foam, and vulcanizing to form sponge rubber.

6. The method of making sponge rubber which comprises preparing a fluid foam of a rubber latex containing 0.2 to 1 part of ammonium perfluorocaprylate, 0.5 part of a water-soluble soap of soap-forming monocarboxylic acid, and 0.5 to 5 parts of sodium silicofluoride, per 100 parts of latex solids, shaping and gelling the foam, and vulcanizing to form sponge rubber.

References Cited in the file of this patent
UNITED STATES PATENTS

| | | |
|---|---|---|
| 2,261,439 | Kelly | Nov. 4, 1941 |
| 2,321,111 | Stamberger | June 8, 1943 |
| 2,567,011 | Diesslin et al. | Sept. 4, 1951 |